United States Patent [19]
Cooper

[11] Patent Number: 5,817,233
[45] Date of Patent: Oct. 6, 1998

[54] MAGNETIC FILTERING APPARATUS

[75] Inventor: Terry Cooper, Marietta, Ohio

[73] Assignee: Fluid Magnetics, Inc., Marietta, Ohio

[21] Appl. No.: 785,014

[22] Filed: Jan. 17, 1997

[51] Int. Cl.⁶ ................................................. B01D 35/06
[52] U.S. Cl. ......................... 210/223; 210/695; 184/625
[58] Field of Search .................................. 210/222, 223; 184/625

[56] References Cited

U.S. PATENT DOCUMENTS

| | | | |
|---|---|---|---|
| 4,218,320 | 8/1980 | Liaw | 210/223 |
| 4,446,019 | 5/1984 | Robinson | 210/223 |
| 4,450,075 | 5/1984 | Krow | 210/223 |
| 4,498,987 | 2/1985 | Inaba | 210/222 |
| 4,585,553 | 4/1986 | Hikosaka et al. | 210/107 |
| 4,629,558 | 12/1986 | Garritty | 210/130 |
| 4,705,626 | 11/1987 | Morelli | 210/130 |
| 4,826,592 | 5/1989 | Taylor | 210/223 |
| 4,894,153 | 1/1990 | Shirdavani | 210/222 |
| 4,992,166 | 2/1991 | Lowsky et al. | 210/130 |
| 5,009,779 | 4/1991 | Hebert | 210/223 |
| 5,078,871 | 1/1992 | McCready | 210/222 |
| 5,089,129 | 2/1992 | Brigman | 210/222 |
| 5,186,827 | 2/1993 | Liberti et al. | 210/222 |
| 5,228,990 | 7/1993 | Chiang | 210/223 |
| 5,354,462 | 10/1994 | Perritt | 210/223 |
| 5,556,540 | 9/1996 | Brunsting | 210/222 |

OTHER PUBLICATIONS

Brochure entitled "Halex Coil" by Halex Development & Distributing LLC, (not dated).
Damark catalog dated Jan. 1998 regarding the ad on the mineral magnet that eliminates scale and deposit in water pipes.

*Primary Examiner*—David A. Reifsnyder
*Attorney, Agent, or Firm*—Emerson & Associates; Roger D. Emerson; John M. Skeriotis

[57] ABSTRACT

An apparatus for removing magnetically attractable particles from a fluid in combination with an associated filter is disclosed. The filter, typically an oil filter, has a magnetically attractable outer wall enclosing an internal chamber. The outer wall has an inner surface and an outer surface. The fluid circulates through the internal chamber. The apparatus includes a magnetic member having a plurality of regions of alternating polarity, the magnetic member being retained against the outer surface of the outer wall, a flux apparatus for directing magnetic flux within the internal chamber, and an opening clamp. The method includes the steps of opening the opening clamp, removing the magnetic member from the filter, replacing the filter with a second filter, placing the magnetic member onto the second filter, and closing the opening clamp.

9 Claims, 4 Drawing Sheets

MAGNETIC FILTERING APPARATUS

BACKGROUND OF THE INVENTION

1. Field of Invention

This invention pertains to the art of methods and apparatuses for filtering particles from a fluid, and more specifically to methods and apparatuses for filtering magnetically attractable particles and other particles from an engine fluid using magnets.

2. Description of the Related Art

In the past, most engines, particularly those used in automobiles, used canister-shaped oil filters to remove foreign particles from the engine oil used to lubricate the moving parts of the engine. Traditional oil filters relied upon a filtration method of removing particles by passing the engine oil through a porous material that captured large impurities in the oil. However, many of the particles are attractable by magnetism, herein referred to as "magnetically attractable particles", such as metal shavings from worn engine parts, were smaller than the openings in the porous material used in the oil filter. Therefore, many of the magnetically attractable particles in engine oil were not removed by the oil filter and continue to circulate through the engine by way of the oil. Left in the oil, the magnetically attractable particles further damaged engine parts.

A magnetic assembly for oil filters is disclosed in U.S. Pat. No. 5,556,540. The patent teaches the use of magnets placed around the oil filter to attract magnetically attractable particles to the sidewall of the oil filter. However, the arrangement the magnets on the outside of the oil filter makes the magnetic assembly virtually impossible to remove from the oil filter. With the high costs associated with the magnets, the inability to remove the magnetic assembly from the used oil filter makes the magnetic assembly as disclosed in the patent cost prohibitive.

The present invention contemplates a new and improved method and apparatus for removing magnetically attractable particles from engine oil and other fluids which is simple in design, effective in use, and overcomes the foregoing difficulties and others while providing better and more advantageous overall results.

SUMMARY OF THE INVENTION

In accordance with the present invention, a new and improved method and apparatus for filtering magnetically attractable particles from an engine fluid is provided which utilizes a magnetic filter assembly that is removable from the fluid filter.

More particularly, in accordance with the present invention, an apparatus for removing magnetically attractable particles from a fluid in combination with an associated filter is disclosed, the filter having a magnetically attractable outer wall enclosing an internal chamber, the outer wall having an inner surface and an outer surface, the fluid circulating through the internal chamber, the apparatus including a magnetic member having a plurality of regions of alternating polarity, the magnetic member being retained against the outer surface of the outer wall. The apparatus also includes flux means for directing magnetic flux within the internal chamber and removing means for removing the apparatus from the associated filter.

According to one aspect of the present invention, a method of changing a lubricant filter is disclosed. The lubricant filter is a portion of a lubrication system for circulating a lubricant, the lubricant filter being encircled by a magnetic member for attracting magnetically attractable particles from the lubricant, the magnetic member including an outer cover and an opening clamp. The method includes the steps of opening the opening clamp, removing the magnetic member from the lubricant filter, replacing the lubricant filter with a second lubricant filter, placing the magnetic member onto the second lubricant filter, and closing the opening clamp.

One advantage of the present invention is that the magnetic filter assembly removes magnetically attractable particles from engine oil that would otherwise be circulated through the engine lubrication system.

Another advantage of the present invention is that the magnetic filter assembly is removable from the oil filter.

Another advantage of the present invention is that the magnetic filter assembly is reusable.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and herein.

DESCRIPTION OF THE PREFERRED EMBODIMENT

Figure 1:
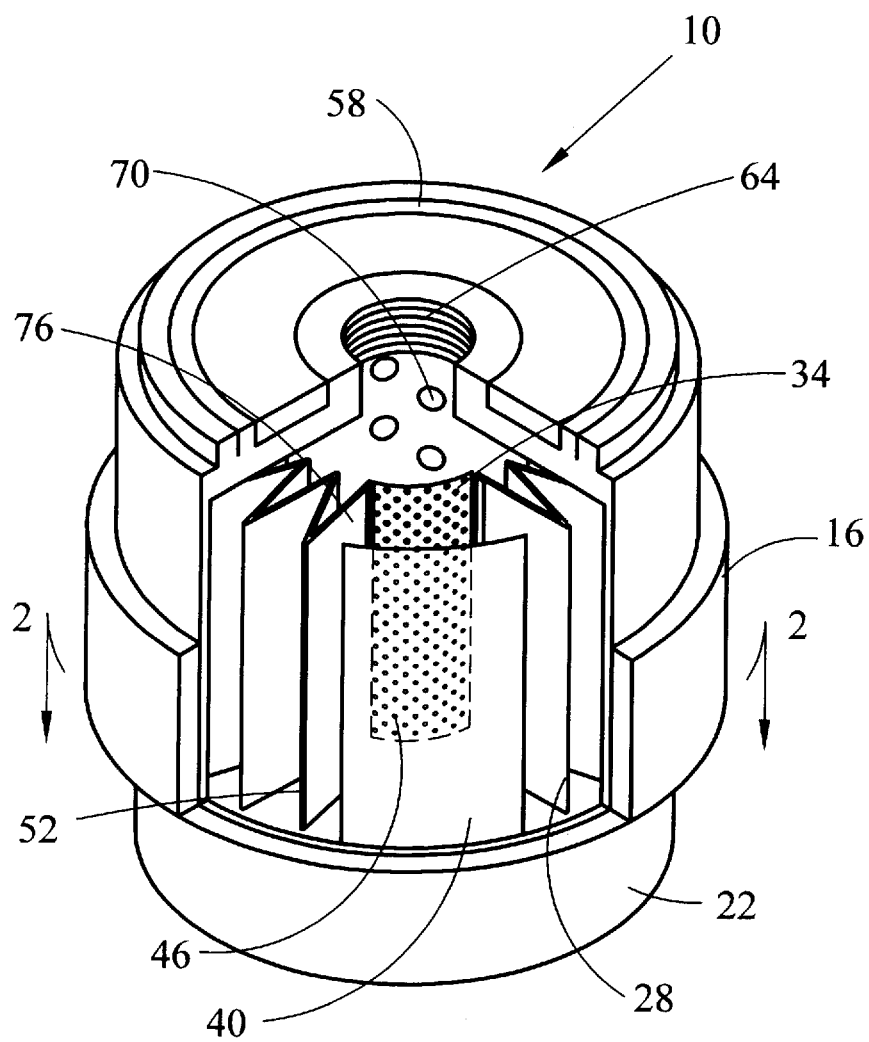
FIG. 1 is a cut-away perspective view of an oil filter and the inventive apparatus.

Referring now to the drawings wherein the showings are for purposes of illustrating a preferred embodiment of the invention only and not for purposes of limiting the same, FIG. 1 shows a perspective view of a typical oil filter 10 and a magnetic filter assembly 16. The oil filter 10 includes a cylindrical, closed-ended canister 22 that is typically made of steel. A filter 28 is contained within the canister 22 and is usually accordion-folded. The filter 28 surrounds a hollow core 34 in the center of the canister 22. The core 34 is lined by a liner 40 with a plurality of holes 46 therein. The accordion-folded filter 28 has a number of vanes 52 that typically radiate from the core 34. The vanes 52 of the filter 28 are made of a porous material that allows a fluid, such as motor oil, to pass through but captures foreign particles carried by the fluid. A circular plate 58 is mounted to the top end of the canister 22. The circular plate 58 has a threaded opening 64 that corresponds to the core 34 of the oil filter 10 and a plurality of circular openings 70 positioned radially from the threaded opening 64 and circumferentially spaced from one another.

The oil filter 10 is attached, preferably threaded, to a filter mount (not shown) of an engine (not shown). Engine oil enters the oil filter 10 through the circular openings 70 and fills the interior volume 76 of the oil filter between the canister 22 and core 34. The oil flows through the vanes 52 of the filter 28 and through the holes 46 in the liner 40 to the hollow core 34. The oil then flows from the core 34 through the threaded opening 64 and is recirculated back to the engine.

In the preferred embodiment of the invention, the magnetic filter assembly 16 is mounted to the oil filter 10 to aid in the removal of foreign particles from the engine oil. Typically, shavings of engine parts created by the friction of the engine parts rubbing together are circulated in the engine oil. The engine parts and, therefore, the shavings, are typically made of steel, which is composed of iron, making the shavings attracted by magnetic fields. Often the shavings are too small to be captured by the filter 28, but the shavings may be large enough to further wear down engine parts. Continuous wear may lead to engine failure. The magnetic filter assembly 16 helps to remove the small shavings and other magnetically attractable particles from the engine oil.

Figure 2:
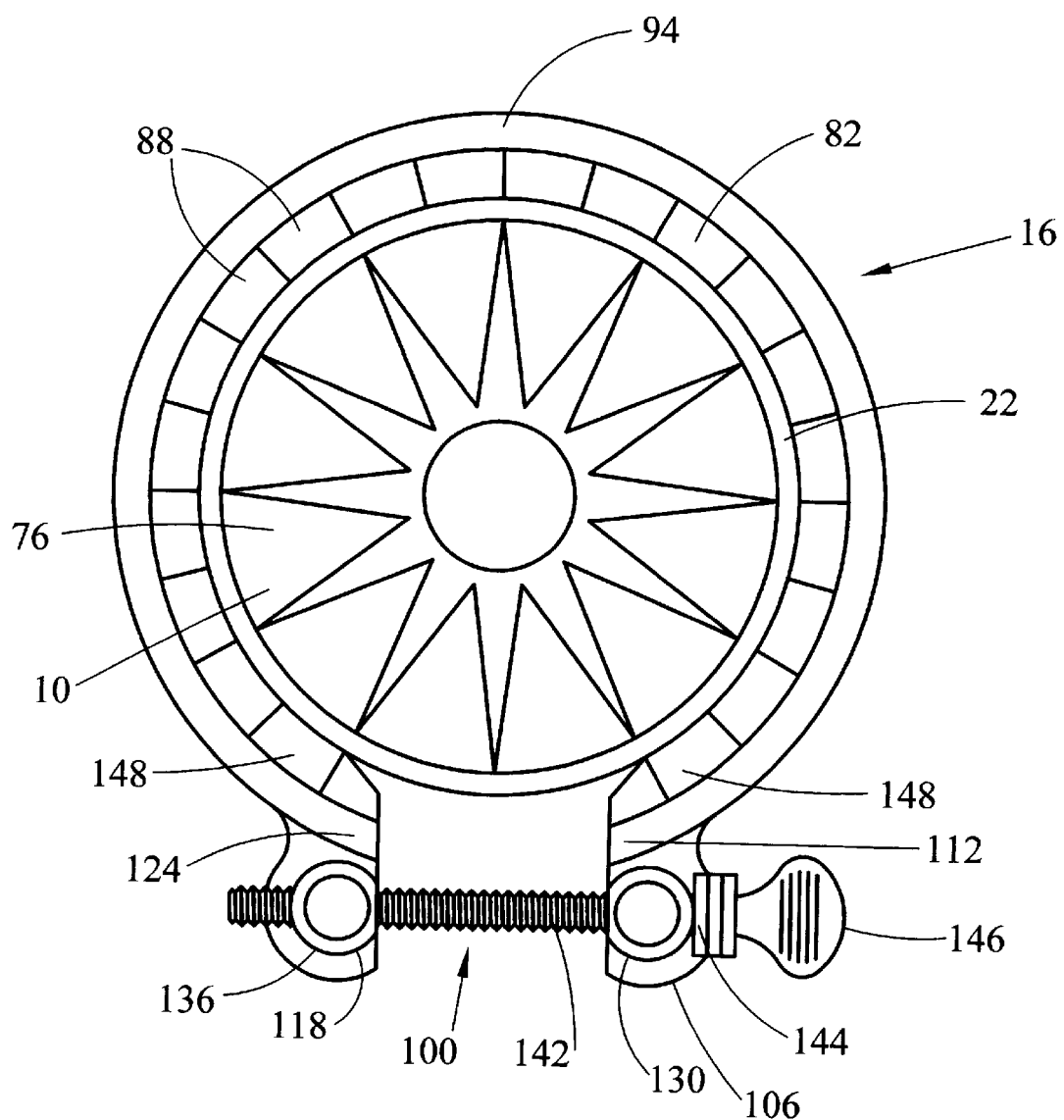
FIG. 2 is a cross-section of the inventive apparatus taken along line 2—2 of FIG. 1.
Figure 4:
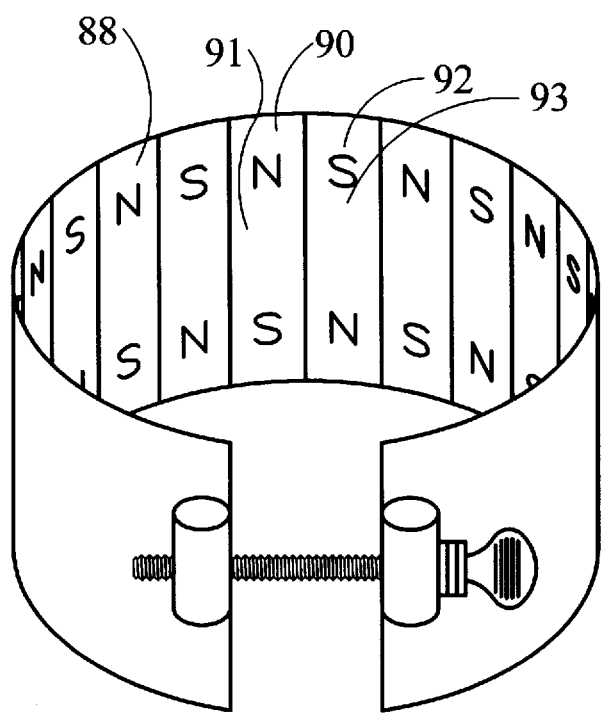

FIG. 2 shows a cross section of FIG. 1 along line 2—2. The magnetic filter assembly 16 is substantially circular in shape. The magnetic filter assembly 16 features a magnetic member 82 mounted to the outside of the canister 22 of the oil filter 10. In the preferred embodiment, the magnetic member 82 includes a plurality of magnets 88 mounted to the canister 22 by the magnetic force of the magnets on the canister 22. As shown in FIG. 4, the magnets 88 are preferably arranged in alternating polarity (characterized by the letters N and S in FIG. 4), with the north pole 90 of a first magnet 91 corresponding with the south pole 92 of a neighboring magnet 93. With continuing reference to FIG. 2, the magnetic filter assembly 16 also includes means for directing the magnetic flux of the magnets 88, such as flux amplifier 94. The flux amplifier 94 directs the flux of the magnets to the interior volume 76 of the oil filter 10. The flux amplifier 94 is preferably made of steel and should have a thickness greater than the thickness of the canister 22. The flux amplifier 94 provides a more efficient, low reluctance path for the magnetic flux to travel. Therefore, the flux amplifier 94 significantly focuses the magnetic field generated by the magnets 88 inward by providing a low reluctance path for the magnetic flux to travel through outside of the magnetic filter assembly 16.

The magnetic force that holds the magnets 88 to the canister 22, measured at approximately 1,400 gauss, makes removal of the magnetic filter assembly 16 from the oil filter 10 extremely difficult. The costs of the magnets 88 make reuse of the magnetic filter assembly 16 essential. Therefore, a removing means for removing the magnetic filter assembly 16 is provided in the inventive apparatus. In the preferred embodiment of the invention, the removing means takes the form of an opening clamp 100 although other forms of the removing means are within the scope of the invention. For example, the removing means could be any means for providing a mechanical advantage to remove the magnetic filter assembly 16 from the canister 22, such as a lever, another form of screw, a cam, etc. The preferred form of the removing means is the opening clamp 100 illustrated in FIGS. 2–4. The opening clamp 100 is included to aid in the removal of the magnetic filter assembly 16. The opening clamp 100 includes a first member 106 connected to a first end 112 of the magnetic filter assembly 16 and a second member 118 connected to a second end 124 of the magnetic filter assembly 16. Each of the members 106,118 has a hole 130,136 therein to receive a screw 142. A spring 144 is preferably placed around the screw 142 between the end 146 of the screw 142 and the first member 106 to lessen the mechanical force required to rotate the screw 142. The spring also helps to keep from over tightening the band to keep from crushing or distorting the filter so as not to restrict the flow or void new spin-on oil filter warranty. The spring also helps in the expansion and contraction of the oil filter so it's not to restrict its normal movement. For example, metals, oils, and other materials may expand and contract due to temperature changes. The spring setting is from 70–110 PSI. The opening clamp 100 is used to force the first few magnets 148 near the first and second ends 112,124 of the magnetic filter assembly 16 away from the canister 22.

Figure 3:
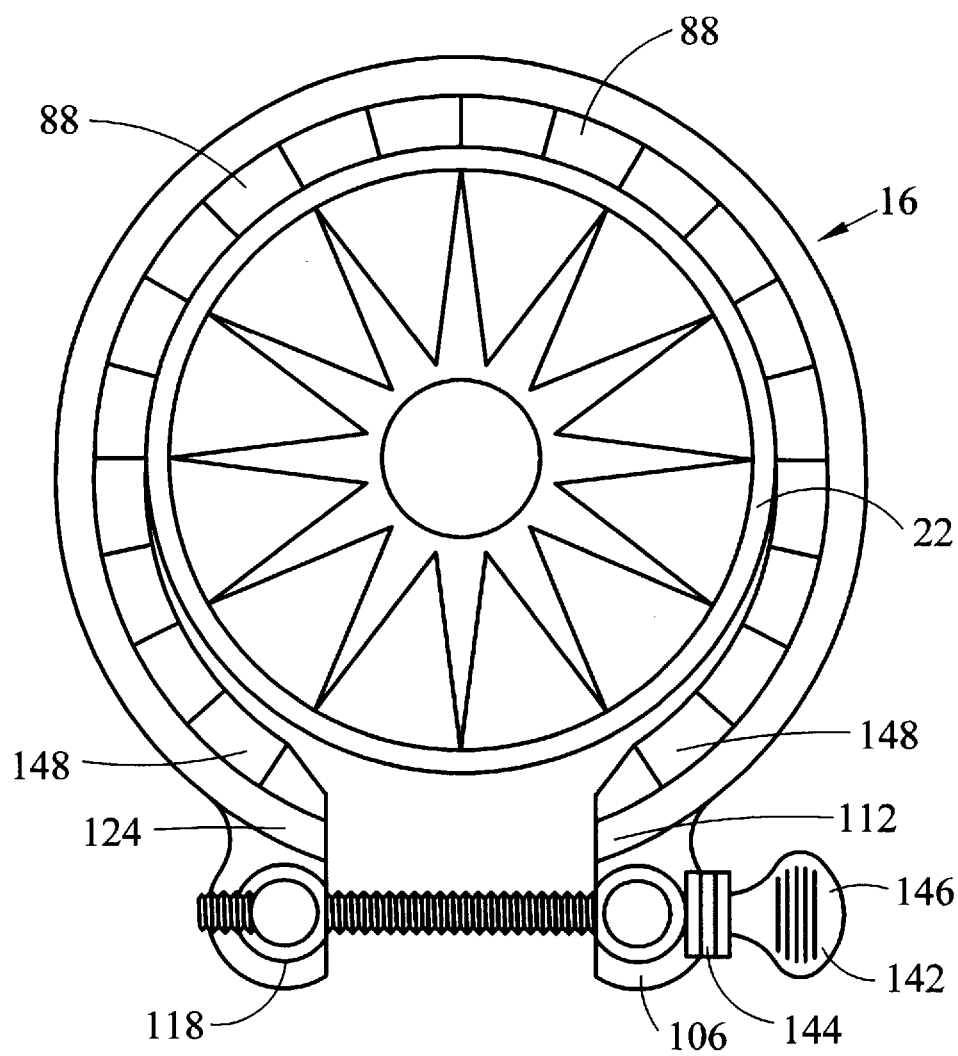
FIG. 3 is a cross-sectional view of the inventive apparatus in an opened position; and, FIG. 4 is a perspective view of the inventive apparatus.

As shown in FIG. 3, when screw 142 is rotated, the screw 142 forces apart the two members 106,118. The two members 106,118 for apart the ends 112,124 of the magnetic filter apparatus 16. The force produced is great enough to force the first few magnets 148 near the ends 112,124 to disengage from the canister 22. Once the first few magnets 148 are disengaged, the remaining magnets 88 engaged with the canister 22 may be disengaged by other means, and the magnetic filter assembly 16 may be removed from the canister 22.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. An apparatus for removing magnetically attractable particles from a fluid in combination with a filter, said filter having a magnetically attractable outer wall enclosing an internal chamber, said outer wall having an inner surface and an outer surface, said fluid circulating through said internal chamber, said apparatus comprising:

a magnetic member having a plurality of regions of alternating polarity, said magnetic member being retained against said outer surface of said outer wall; and, removing means for removing said apparatus from said filter wherein said removing means comprises an opening clamp for providing a mechanical advantage to remove said apparatus from said filter.

2. The apparatus of claim 1 wherein said opening clamp comprises:

a first member with a hole therein, said first member being connected to a first end of said apparatus;

a second member with a threaded hole therein, said second member being connected to a second end of said apparatus; and, a screw threaded through said hole in said first member and said threaded hole in said second member, said first member and said second member being forced apart from one another when said screw is rotated.

3. The apparatus of claim 2 wherein said opening clamp further comprises:

a spring, said spring contacting said first member and being disposed about said screw between said first member and an end of said screw.

4. The apparatus of claim 1 further comprising:

flux means for directing magnetic flux within said internal chamber.

5. The apparatus of claim 4 wherein said flux means comprises:

a cylindrically shaped cover encompassing said magnetic member.

6. The apparatus of claim 5 wherein said cover is made of steel.

7. The apparatus of claim 5 wherein said cover has a first thickness and said outer wall has a second thickness, said first thickness being greater than said second thickness.

8. The apparatus of claim 1 wherein said magnetic member comprises:

a plurality of magnets.

9. The apparatus of claim 8 wherein each of said plurality of magnets has regions of north polarity and south polarity, said plurality of magnets being arranged by regions of alternating polarity.

* * * * *